(12) United States Patent
Srikanth et al.

(10) Patent No.: US 8,983,989 B2
(45) Date of Patent: Mar. 17, 2015

(54) CONTEXTUAL QUERIES

(75) Inventors: Munirathnam Srikanth, Redmond, WA (US); Phani Vaddadi, Issaquah, WA (US); Tarek Najm, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 111 days.

(21) Appl. No.: 12/700,985

(22) Filed: Feb. 5, 2010

(65) Prior Publication Data

US 2011/0196852 A1    Aug. 11, 2011

(51) Int. Cl.
*G06F 17/30* (2006.01)
*G06F 7/00* (2006.01)

(52) U.S. Cl.
CPC ...... *G06F 17/3066* (2013.01); *G06F 17/30731* (2013.01); *G06F 17/30864* (2013.01)
USPC .......................................... 707/759; 707/769

(58) Field of Classification Search
USPC ................................................ 707/759, 760
See application file for complete search history.

(56) References Cited

U.S. PATENT DOCUMENTS

| | | | |
|---|---|---|---|
| 5,748,974 A | 5/1998 | Johnson | |
| 5,835,087 A | 11/1998 | Herz et al. | |
| 6,038,560 A | 3/2000 | Wical | |
| 6,154,213 A | 11/2000 | Rennison et al. | |
| 6,256,031 B1 | 7/2001 | Meijer et al. | |
| 6,510,406 B1 | 1/2003 | Marchisio | |
| 6,556,983 B1 | 4/2003 | Altschuler et al. | |
| 6,567,805 B1 | 5/2003 | Johnson | |
| 6,675,159 B1 | 1/2004 | Lin et al. | |
| 6,681,218 B1 | 1/2004 | Zou | |
| 6,859,800 B1 | 2/2005 | Roche | |
| 6,868,525 B1 | 3/2005 | Szabo | |
| 6,871,202 B2 | 3/2005 | Broder | |
| 6,968,332 B1 | 11/2005 | Milic-Frayling et al. | |
| 7,085,771 B2 | 8/2006 | Chung et al. | |
| 7,089,226 B1 | 8/2006 | Dumais et al. | |
| 7,152,031 B1 | 12/2006 | Jensen et al. | |
| 7,153,137 B2 | 12/2006 | Altenhofen | |

(Continued)

FOREIGN PATENT DOCUMENTS

| | | |
|---|---|---|
| CN | 1535433 | 10/2004 |
| CN | 101124609 | 2/2008 |

(Continued)

OTHER PUBLICATIONS

Kiryakov et al., "Semantic Annotation, Indexing, and Retrieval", Web Semantics: Science, Services and Agents on the World Wide Web, Elsevier, vol. 2, No. 1, Dec. 1, 2004, pp. 58-73.*

(Continued)

*Primary Examiner* — Pavan Mamillapalli
(74) *Attorney, Agent, or Firm* — Jessica Meyers; Doug Barker; Micky Minhas (57) ABSTRACT

Systems, methods, and computer-storage media for generating contextual queries are provided. The system includes a search engine to receive user queries and contexts, a query understanding component to generate a semantic representation of the query, and a data source command generator to transform the semantic representation into commands for multiple data sources. The data source command generator is connected to the query understanding component. The data source command generator selects data source commands based on lexical information associated with each data source.

20 Claims, 3 Drawing Sheets

(56) References Cited

U.S. PATENT DOCUMENTS

| | | | |
|---|---|---|---|
| 7,167,866 B2 | 1/2007 | Farnham | |
| 7,171,424 B2 | 1/2007 | Barsness et al. | |
| 7,213,205 B1 | 5/2007 | Miwa et al. | |
| 7,225,407 B2 | 5/2007 | Sommerer | |
| 7,249,018 B2* | 7/2007 | Ross et al. | 704/257 |
| 7,275,061 B1 | 9/2007 | Kon et al. | |
| 7,292,243 B1 | 11/2007 | Burke | |
| 7,321,883 B1* | 1/2008 | Freedy et al. | 706/45 |
| 7,350,138 B1 | 3/2008 | Swaminathan et al. | |
| 7,376,670 B2* | 5/2008 | Badt et al. | 707/999.102 |
| 7,421,450 B1 | 9/2008 | Mazzarella et al. | |
| 7,448,047 B2 | 11/2008 | Poole | |
| 7,496,830 B2 | 2/2009 | Rubin | |
| 7,505,985 B2 | 3/2009 | Kilroy | |
| 7,565,627 B2 | 7/2009 | Brill | |
| 7,577,646 B2 | 8/2009 | Chien | |
| 7,636,779 B2 | 12/2009 | Hayashi et al. | |
| 7,657,518 B2 | 2/2010 | Budzik et al. | |
| 7,657,546 B2* | 2/2010 | Goodwin et al. | 707/999.1 |
| 7,668,813 B2 | 2/2010 | Baeza-Yates | |
| 7,676,485 B2 | 3/2010 | Elfayoumy et al. | |
| 7,694,212 B2 | 4/2010 | Fikes et al. | |
| 7,707,201 B2 | 4/2010 | Kapur et al. | |
| 7,739,104 B2* | 6/2010 | Berkan et al. | 704/9 |
| 7,743,360 B2 | 6/2010 | Venolia | |
| 7,809,705 B2 | 10/2010 | Dom et al. | |
| 7,809,717 B1 | 10/2010 | Hoeber et al. | |
| 7,818,315 B2 | 10/2010 | Cucerzan et al. | |
| 7,849,080 B2 | 12/2010 | Chang et al. | |
| 7,860,853 B2 | 12/2010 | Ren et al. | |
| 7,870,117 B1 | 1/2011 | Rennison | |
| 7,921,107 B2 | 4/2011 | Chang et al. | |
| 7,921,108 B2 | 4/2011 | Wang et al. | |
| 7,921,109 B2 | 4/2011 | Parikh et al. | |
| 7,934,161 B1 | 4/2011 | Denise | |
| 7,937,340 B2 | 5/2011 | Hurst-Hiller et al. | |
| 7,958,115 B2 | 6/2011 | Kraft | |
| 7,966,305 B2 | 6/2011 | Olsen et al. | |
| 7,970,721 B2 | 6/2011 | Leskovec et al. | |
| 8,015,006 B2 | 9/2011 | Kennewick et al. | |
| 8,024,329 B1 | 9/2011 | Rennison | |
| 8,051,104 B2 | 11/2011 | Weissman et al. | |
| 8,086,600 B2 | 12/2011 | Bailey et al. | |
| 8,090,713 B2 | 1/2012 | Tong et al. | |
| 8,090,724 B1 | 1/2012 | Welch et al. | |
| 8,108,385 B2 | 1/2012 | Kraft et al. | |
| 8,122,016 B1 | 2/2012 | Lamba et al. | |
| 8,122,017 B1 | 2/2012 | Sung et al. | |
| 8,126,880 B2 | 2/2012 | Dexter et al. | |
| 8,150,859 B2 | 4/2012 | Vadlamani et al. | |
| 8,176,041 B1 | 5/2012 | Harinarayan et al. | |
| 8,229,900 B2 | 7/2012 | Houle | |
| 8,260,664 B2 | 9/2012 | Vadlamani et al. | |
| 8,326,842 B2 | 12/2012 | Vadlamani et al. | |
| 8,386,509 B1 | 2/2013 | Scofield et al. | |
| 8,447,760 B1 | 5/2013 | Tong et al. | |
| 8,706,709 B2 | 4/2014 | Ahuja et al. | |
| 2002/0049738 A1 | 4/2002 | Epstein | |
| 2002/0062368 A1 | 5/2002 | Holtzman et al. | |
| 2003/0078913 A1 | 4/2003 | McGreevy | |
| 2003/0177112 A1 | 9/2003 | Gardner | |
| 2003/0217052 A1 | 11/2003 | Rubenczyk | |
| 2004/0003351 A1 | 1/2004 | Sommerer | |
| 2004/0015483 A1* | 1/2004 | Hogan | 707/3 |
| 2004/0030741 A1 | 2/2004 | Wolton | |
| 2004/0169688 A1 | 9/2004 | Burdick | |
| 2005/0022114 A1 | 1/2005 | Shanahan et al. | |
| 2005/0055341 A1 | 3/2005 | Haahr | |
| 2005/0080775 A1 | 4/2005 | Colledge | |
| 2005/0125219 A1* | 6/2005 | Dymetman et al. | 704/9 |
| 2005/0125400 A1 | 6/2005 | Mori et al. | |
| 2005/0132297 A1 | 6/2005 | Milic-Frayling | |
| 2005/0149510 A1 | 7/2005 | Shafrir | |
| 2005/0198011 A1 | 9/2005 | Barsness et al. | |
| 2005/0203924 A1 | 9/2005 | Rosenberg | |
| 2005/0257894 A1 | 11/2005 | Biagiotti | |
| 2005/0268341 A1 | 12/2005 | Ross | |
| 2006/0004732 A1 | 1/2006 | Odom | |
| 2006/0005156 A1 | 1/2006 | Korpipaa | |
| 2006/0036408 A1 | 2/2006 | Templier et al. | |
| 2006/0069589 A1 | 3/2006 | Nigam et al. | |
| 2006/0069617 A1 | 3/2006 | Milener | |
| 2006/0074870 A1 | 4/2006 | Brill et al. | |
| 2006/0106793 A1 | 5/2006 | Liang | |
| 2006/0116994 A1 | 6/2006 | Jonker | |
| 2006/0117002 A1 | 6/2006 | Swen | |
| 2006/0122979 A1 | 6/2006 | Kapur et al. | |
| 2006/0242147 A1 | 10/2006 | Gehrking | |
| 2006/0248078 A1 | 11/2006 | Gross et al. | |
| 2006/0287919 A1 | 12/2006 | Rubens | |
| 2006/0287983 A1* | 12/2006 | Krauss et al. | 707/3 |
| 2007/0011155 A1 | 1/2007 | Sarkar | |
| 2007/0011649 A1 | 1/2007 | Venolia | |
| 2007/0038601 A1 | 2/2007 | Guha | |
| 2007/0094256 A1 | 4/2007 | Hite | |
| 2007/0136246 A1 | 6/2007 | Stenchikova et al. | |
| 2007/0150515 A1 | 6/2007 | Brave et al. | |
| 2007/0174255 A1 | 7/2007 | Sravanapudi | |
| 2007/0226198 A1 | 9/2007 | Kapur | |
| 2007/0294070 A1 | 12/2007 | Au | |
| 2008/0010311 A1 | 1/2008 | Kon et al. | |
| 2008/0033932 A1 | 2/2008 | DeLong | |
| 2008/0033982 A1 | 2/2008 | Parikh et al. | |
| 2008/0059508 A1 | 3/2008 | Lu et al. | |
| 2008/0082477 A1 | 4/2008 | Dominowska et al. | |
| 2008/0104061 A1 | 5/2008 | Rezaei | |
| 2008/0104071 A1 | 5/2008 | Pragada | |
| 2008/0133482 A1 | 6/2008 | Anick et al. | |
| 2008/0133488 A1* | 6/2008 | Bandaru et al. | 707/3 |
| 2008/0133585 A1 | 6/2008 | Vogel | |
| 2008/0208824 A1 | 8/2008 | Curtis et al. | |
| 2008/0235203 A1 | 9/2008 | Case | |
| 2008/0243779 A1 | 10/2008 | Behnen et al. | |
| 2008/0256061 A1 | 10/2008 | Chang | |
| 2008/0270384 A1 | 10/2008 | Tak | |
| 2008/0288641 A1 | 11/2008 | Messer et al. | |
| 2008/0313119 A1 | 12/2008 | Leskovec et al. | |
| 2009/0024962 A1* | 1/2009 | Gotz | 715/838 |
| 2009/0055394 A1 | 2/2009 | Schilit et al. | |
| 2009/0083261 A1 | 3/2009 | Nagano | |
| 2009/0089312 A1 | 4/2009 | Chi et al. | |
| 2009/0100037 A1 | 4/2009 | Scheibe | |
| 2009/0119261 A1 | 5/2009 | Ismalon | |
| 2009/0119289 A1 | 5/2009 | Gibbs et al. | |
| 2009/0125505 A1 | 5/2009 | Bhalotia | |
| 2009/0157419 A1 | 6/2009 | Bursey | |
| 2009/0157676 A1 | 6/2009 | Shanbhag | |
| 2009/0164441 A1 | 6/2009 | Cheyer | |
| 2009/0234814 A1 | 9/2009 | Boerries | |
| 2009/0240672 A1 | 9/2009 | Costello | |
| 2009/0241065 A1 | 9/2009 | Costello | |
| 2009/0254574 A1* | 10/2009 | De et al. | 707/100 |
| 2009/0299853 A1 | 12/2009 | Jones et al. | |
| 2010/0005092 A1 | 1/2010 | Matson | |
| 2010/0010913 A1 | 1/2010 | Pinckney et al. | |
| 2010/0023508 A1 | 1/2010 | Zeng | |
| 2010/0042619 A1 | 2/2010 | Jones et al. | |
| 2010/0049682 A1 | 2/2010 | Chow | |
| 2010/0070484 A1 | 3/2010 | Kraft et al. | |
| 2010/0106485 A1* | 4/2010 | Lu et al. | 704/9 |
| 2010/0131085 A1 | 5/2010 | Steelberg | |
| 2010/0138402 A1 | 6/2010 | Burroughs et al. | |
| 2010/0223261 A1 | 9/2010 | Sarkar | |
| 2010/0332500 A1 | 12/2010 | Pan et al. | |
| 2011/0040749 A1 | 2/2011 | Ceri et al. | |
| 2011/0047148 A1 | 2/2011 | Omoigui | |
| 2011/0047149 A1 | 2/2011 | Vaananen | |
| 2011/0055189 A1 | 3/2011 | Effrat et al. | |
| 2011/0055207 A1 | 3/2011 | Schorzman et al. | |
| 2011/0125734 A1 | 5/2011 | Duboue et al. | |
| 2011/0131157 A1 | 6/2011 | Iyer et al. | |
| 2011/0131205 A1 | 6/2011 | Iyer et al. | |
| 2011/0145232 A1 | 6/2011 | Chang et al. | |
| 2011/0179024 A1 | 7/2011 | Stiver et al. | |

(56) References Cited

U.S. PATENT DOCUMENTS

| | | | |
|---|---|---|---|
| 2011/0196737 | A1 | 8/2011 | Vadlamani et al. |
| 2011/0196851 | A1 | 8/2011 | Vadlamani et al. |
| 2011/0196852 | A1 | 8/2011 | Srikanth et al. |
| 2011/0231395 | A1 | 9/2011 | Vadlamani et al. |
| 2011/0264655 | A1 | 10/2011 | Xiao et al. |
| 2011/0264656 | A1 | 10/2011 | Dumais et al. |
| 2011/0307460 | A1 | 12/2011 | Vadlamani et al. |
| 2012/0130999 | A1 | 5/2012 | Jin et al. |

FOREIGN PATENT DOCUMENTS

| | | |
|---|---|---|
| CN | 101137957 | 3/2008 |
| CN | 101356525 | 1/2009 |
| CN | 101364239 A | 2/2009 |
| CN | 101432719 A | 5/2009 |
| JP | 2003032292 | 2/1991 |
| JP | 2005165958 | 2/1993 |
| JP | 2008235185 | 9/1996 |
| JP | 2005-165416 A | 6/2005 |
| JP | 2009252145 | 10/2009 |
| KR | 10-0837751 | 6/2008 |
| WO | 01-50330 | 7/2001 |
| WO | 2007113546 A1 | 10/2007 |
| WO | 2007143109 | 12/2007 |
| WO | 2008027503 | 3/2008 |
| WO | 2009117273 | 9/2009 |
| WO | 2010148419 | 12/2010 |

OTHER PUBLICATIONS

Chirita et al., "Personalized Query Expansion for the Web", SIGIR 2007 Proceedings, Jul. 23-27, 2007 pp. 7-14.*
International Search Report and Written opinion in PTC/US2011/021210 mailed Aug. 19, 2011.
Tony Veale and Yanfen Hao, "A context-sensitive framework for lexical ontologies", The Knowledge Engineering Review, vol. 23:1, 101-115, Cambridge University Press, Published Date: 2007, United Kingdom, http://afflatus.ucd.ie/Papers/ContextAndLexicalOntologies.pdf.
Thomas Strang, Claudia Linnhoff-Popien, and Korbinian Frank, "CoOL: A Context Ontology Language to enable Contextual Interoperability", IFIP International Federation for Information Processing, Published Date: 2003, http://citeseerx.ist.psu.edu/viewdoc/download;jsessionid=BC65BEE5025FB518404AF16988E46489?doi=10.1.1.5.9505&rep=rep1&type=pdf.
"Google Wonder Wheel, Google Wonder Wheel Explained", Google Inc., Published Date: 2009, http://www.googlewonderwheel.com/.
"Cuil—Features", Cuil, Inc., Published Date: 2010, http://www.cuil.com/info/features/.
"Kosmix: Your Guide to the Web", Kosmix Corporation, Published Date: 2010, http://www.kosmix.com/corp/about.
Hao Liang, et al., "Translating Query for Deep Web Using Ontology", 2008 International Conference on Computer Science and Software Engineering, IEEE Computer Society, Published Date: 2008, http://ieeexplore.ieee.org/stamp/stamp.jsp?arnumber=04722650.
Office Action in U.S. Appl. No. 12/700,980 mailed Nov. 25, 2011.
Bade, Korinna, et al, An Architecture for the Development of Context Adaptive Retrieval Systems, Published Feb. 14, 2006, http://www.springerlink.com/content/jk3wj13251rh6581/fulltext/.pdf.
Batko, Michal, et al., "On Scalability of the Similarity Search in the World of Peers," May 29-Jun. 1, 2006, 12 pages, Proceedings of the First International Conference on Scalable Information Systems, Hong Kong http://www.nmis.isti.cnr.it/falchi/publications/Falchi-2006-Infoscale.pdf.
Broder, Andrei, et al., A Semantic Approach to Contextual Advertising, Published Jul. 23-27, 2007, http://fontoura.org/papers/semsyn.pdf.
Chirita, Paul-Alexandru, et al., Personalized Query Expansion for the Web, Published Jul. 27, 2007, http://delivery.acm.org/10.1145/120000011277746/p7-chirita.pdf?key1=1277746&key2=8684409521&coll=GUIDE&CFID=63203797&CFTOKEN=28379565.
Fisher, Brian, et al., "CZWeb: Fish-Eye Views for Visualizing the World-Wide Web", Published 1997, 5 pages, http://scholar.google.co.in/scholar?cluster=3988401955906218135&hl=en&as_sdt=2000.
Gjergji Kasneci, "Searching and Ranking in Entity-Relationship Graphs"—Published Date: Dec. 23, 2009, http://domino.mpi-inf.mpg.de/intranet/ag5/ag5publ. nsf/6a06bf33407d587ec12565dd006fb8de/2c25044ad8d088fdc125763b003d5810/$FILE/gjergji_kasneci_phd.pdf.
Gjergji Kasneci, et al., "NAGA: Searching and Ranking Knowledge"—Published Date: Mar. 2007, http://www.mpi-inf.mpg.de/~ramanath/nagatr.pdf.
Gonen, Bilal, "Semantic Browser", Aug. 2006, 42 pages, University of Georgia, Athens, Georgia, http://citeseerx.ist.psu.edu/viewdoc/download?doi=10.1.1.83.9132&rep=rep1&type=pdf.
Havre, Susan, et al., "Interactive Visualization of Multiple Query Results," 2001, 8 pages, http://citeseerx.ist.psu.edu/viewdoc/download?doi=10.1.1.91.2850&rep=rep1&type=pdf.
Hearst, Marti A., "Ch. 10, Information Visualization for Search Interfaces", 2009, 65 pages, Search User Interfaces, http://searchuserinterfaces.com/book/sui_ch10_visualization.html.
International Search Report and Written Opinion PCT/US2011/021596, mailed Aug. 29, 2011.
International Search Report and Written Opinion PCT/US2011/021597, mailed Sep. 23, 2011.
Jonker, David, et al., "Information Triage with TRIST", May 2005, 6 pages, 2005 Intelligence Analysis Conference, Washington DC, Oculus Info, Inc., http://www.oculusinfo.com/papers/Oculus_TRIST_Final_Distrib.pdf.
Kiryakov, et al., "Semantic Annotation, Indexing, and Retrieval" Web Semantics: Science, Services and Agents on the World Wide Web, Elsevier, vol. 2, No. 1, Dec. 1, 2004, pp. 49-79.
Kosara, Robert, et al., "An Interaction View on Information Visualization", 2003, 15 pages, The Eurographics Association, http://www.cs.uta.fi/~jt68641/infoviz/An_Interaction_View_on_Information_Visualization.pdf.
Kules, Bill, et al., Catergorizing Web Search Results into Meaningful and Stable Categories Using Fast-Feature Techniques, Published Jun. 15, 2006, http://hcil.cs.umd.edu/trs/2006-15/2006-15.pdf.
Leopold, Jennifer, et al., "A Generic, Functionally Comprehensive Approach to Maintaining an Ontology as a Relational Database", 2009, pp. 369-379, World Academy of Science, vol. 52, http://www.akademik.unsri.ac.id/download/journal/files/waset/v52-58-oaj-unsri.pdf.
Mateevitsi, Victor, et al., "Sparklers: An Interactive Visualization and Implementation of the Netflix recommandation algorithm", retrieved Apr. 7, 2010, 5 pages, http://www.vmateevitsi.com/bloptop/.
Nguyen, Tien N., "A Novel Visualization Model for Web Search Results," Sep./Oct. 2006, pp. 981-988, IEEE Transactions on Visualization and Computer Graphics, vol. 12, No. 5, http://ieeexplore.ieee.org/stamp/stamp.jsp?tp=&arnumber=4015455.
Osinski, Stanislaw, An Algorithm for Clustering of Web Search Results, Published Jun. 2003, http://project.carrot2.org/publications/osinski-2003-lingo.pdf.
Rajaraman, Anand, Kosmix: Exploring the Deep Web Using Taxonomies and Categorization, Published 2009, http://ftp.research.microsoft.com/pub/debull/A09June/anand_deepweb1.pdf.
Roberts, Jonathan C., et al.,"Visual Bracketing for Web Search Result Visualization", 2003, 6 pages, Seventh International Conference on Information Visualization, IEEE Computer Society,http://ieeexplore.ieee.org/stamp/stamp.jsp?tp=&arnumber=1217989.
"Smith, Kate A., et al., ""Web Page Clustering using a Self-Organizing Map of User Navigation Patterns""", Published 2003, pp. 245-256, Decision Support Systems, vol. 35, Elsevier Science, http://citeseerx.ist.psu.edu/viewdoc/download?doi=10.1.1.4.5185&rep=rep1&type=pdf".
"Smith, Michael P., et al., ""Providing a User Customisable Tool for Software Visualisation at Runtime,""" Published 2004, 6 pages, University of Durham, United Kingdom, http://citeseerx.ist.psu.edu/viewdoc/download?doi=10.1.1.60.4013&rep=rep1&type=pdf".
"Tvarozek, Michal, et a., ""Improving Semantic Search via Integrated Personalized Faceted and Visual Graph Navigation""", Pub- (56) References Cited

OTHER PUBLICATIONS lished Date: 2008, 12 pages, http://www2.fiit.stuba.sk/~bielik/publ/abstracts/2008/sofsem2008navigation.pdf".
U.S. Department of Transportation, Federal Aviation Administration, "The Effect of Loading Parameters on Fatigue of Composite Laminates: Part IV Information Systems"—Published Date: Dec. 2000, http://www.tc.faa.gov/its/worldpac/techrpt/ar00-48.pdf.
"Volnyansky, Ilya, ""Curse of Dimensionality in the Application of Pivot-based Indexes to the Similarity Search Problem""", Published May 2009, 56 pages, University of Ottawa, Canada, http://arxiv.org/PS_cache/arxiv/pdf/0905/0905.2141v1.pdf".
Wang, Xuerui, et al., A Search-Based Method for Forecasting Ad Impression in Contextual Advertising, Published Apr. 20-24, 2009, http://www.cs.umass.edu/~xuerui/papers/forecasting_www2009.pdf.
Wartena, Christian, et al., Topic Detection by Clustering Keywords, Published Sep. 5, 2008, http://www.uni-weimar.de/medien/webis/research/workshopseries/tir-08/proceedings/18_paper_655.pdf.
"Yngve, Gary, ""Visualization for Biological Models, Simulation, and Ontologies""", Published Aug. 2007, 152 pages, University of Washington, http://sigpubs.biostr.washington.edu/archive/00000232/01/gary-thesis-final.pdf".
Zoltan Gyongyi, et al., "Questioning Yahoo! Answers"—Published Date: Apr. 22, 2008, http://infolab.stanford.edu/~zoltan/publications/gyongyi2008questioning.pdf.
International Search Report and Written Opinion PCT/US2011/020908 mailed Sep. 28, 2011.
Non Final Office Action in U.S. Appl. No. 12/700,980 mailed Nov. 25, 2011.
Non Final Office Action in U.S. Appl. No. 12/701,330 mailed Dec. 21, 2011.
Non Final Office Action in U.S. Appl. No. 12/727,836, mailed Jan. 6, 2012.
Final Office Action, U.S. Appl. No. 12/795,238, mailed Dec. 11, 2012.
Non Final Office Action, mailed Mar. 26, 2012, in U.S. Appl. No. 12/796,753.
Final Office Action, mailed Aug. 6, 2012, In U.S. Appl. No. 12/796,753.
Notice of Allowance, mailed Aug. 24, 2012, in U.S. Appl. No. 13/406,941.
Notice of Allowance in U.S. Appl. No. 13/406,941, mailed Jul. 30, 2012.
Non Final Office Action in U.S. Appl. No. 12/797,375, mailed Sep. 13, 2012.
Final Office Action in U.S. Appl. 12/727,836 mailed Apr. 16, 2012, 14 pages.
Final Office Action in U.S. Appl. 12/700,980, mailed May 10, 2012, 24 pages.
Notice of Allowance in U.S. Appl. No. 12/701,330, mailed Jun. 21, 2012, 14 pages.
NonFinal Office Action in U.S. Appl. No. 12/795,238 mailed Jul. 5, 2012, pp. 1-16.
Chris Halaschek, Boanerges Aleman-Meza, I. Budak Arpinar, and Amit P. Sheth, 2004, Discovering and ranking Semantic Associations Over a Large RDF Metabase. In Proceedings of the Thirtieth International conference on Very large data bases—vol. 30 (VLDB '04), vol. 30. VLDB Endowment, pp. 1317-1320.
Non Final OA mailed Jan. 10, 2014 in U.S. Appl. No. 12/727,836.
Non Final OA mailed Jan. 27, 2014 in U.S. Appl. No. 12/796,753.
Non Final OA mailed Dec. 30, 2013 in U.S. Appl. No. 12/797,375.
Non Final Office Action, mailed Nov. 1, 2013, in U.S. Appl. No. 12/795,238.
Final Office Action mailed Sep. 9, 2013 in U.S. Appl. No. 13/569,460.
Non Final Office Action, mailed Sep. 25, 2013, in U.S. Appl. No. 12/700,980.
First OA mailed Oct. 29, 2013 in CN Application No. 201180008423.2.
Non-Final Office Action mailed Mar. 27, 2013 in U.S. Appl. No. 13/569,460, 25 pages.
Final Office Action mailed Jun. 5, 2013 in U.S. Appl. No. 12/797,375 13 pages.
China 1st Office Action dated Jun. 7, 2013 in CN Application No. 201180008397.3, 5 pages.
China State Intellectual Property Office Search Report dated May 30, 2013 in CN Application 201180008397.3, 2 pages.
Chinese OA mailed Apr. 3, 2014 in CN Application No. 201180008423.2.
Australian Search Information Statement (SIS) in Application No. 2011213263 dated Apr. 10, 2014. 5 pages.
Chinese Office Action dated Feb. 24, 2014 in Application No. 201180008397.3, 3 pages.
Chinese Office Action dated Feb. 18, 2014 in Application No. 201180008411.x with Search Report dated Feb. 7, 2014, 9 pages.
Australian Office Action dated Feb. 21, 2014 in Application No. 2011213263, 4 pages.
Notice of Allowance dated Apr. 11, 2014 in U.S. Appl. No. 12/700,980, 9 pages.
Final Office Action dated Apr. 28, 2014 in U.S. Appl. No. 12/727,836, 22 pages.
Chinese Office Action dated May 19, 2014 in Application No. 201180008427.0, 9 pages.
Chinese Search Report dated Apr. 8, 2014 in Application No. 201180008427.0, 2 pages.
Notice of Allowance dated May 23, 2014 in U.S. Appl. No. 12/700,980, 8 pages.
Japanese Office Action dated Jun. 10, 2014 in Application No. 2012-551987, 7 pages.
Final Office Action dated Apr. 23, 2014 in U.S. Appl. No. 12/795,238, 20 pages.
Final Office Action dated Jul. 16, 2014 in U.S. Appl. No. 12/797,375, 22 pages.
NPL: Kwok et al., "Scaling Question Answering to the Web," University of Washington, Nov. 13, 2000; 21 pages.
Non-Final Office Action dated Sep. 11, 2014 in U.S. Appl. No. 12/727,836, 13 pages.
Chinese Search Report dated Aug. 4, 2014 in Application No. 201180008397.3, 2 pages.
Chinese Office Action dated Aug. 12, 2014 in Application No. 201180008397.3, 3 pages.
Non-Final Office Action dated Sep. 24, 2014 in U.S. Appl. No. 12/796,753, 30 pages.
Final Office Action dated May 30, 2014 in U.S. Appl. No. 12/796,753, 29 pages.
Notice of Allowance Received in Japan Patent Application No. 2012-551987, Mailed Date: Oct. 21, 2014, 3 pages (w/o English Translation).
Chinese Office Action dated Oct. 30, 2014 with Search Report dated Oct. 22, 2014 in Chinese Application No. 201180008411.X, 12 pages.
Chinese Office Action dated Nov. 3, 2014 in Chinese Application No. 201180008423.2, 6 pages.
Chinese Office Action dated Nov. 26, 2014 with Search Report dated Nov. 17, 2014 in Chinese Application No. 201110071760.8, 12 pages.

\* cited by examiner

CONTEXTUAL QUERIES

BACKGROUND

Conventional search engines receive queries from users to locate web pages having terms that match the terms included in the received queries. Conventionally, the search engines ignore the context and meaning of the user query and treat the query as a set of words. The terms included in the query are searched for based on frequency, and results that include the terms of the query are returned by the search engine.

Accordingly, conventional search engines return results that might fail to satisfy the interests of the user. The user attempts to reformulate the query by choosing words that are likely found in a document of interest. For instance, a user looking for stock information may enter a query for "PE Company A Stock." The conventional search engine will treat each word separately and return documents having the term "Company A," documents having the term "PE," documents having the terms "stock," and documents having any of the terms. The conventional search engine is unable to intelligently select documents in results that discuss the stock performance of Company A, a comparison of Company A to its competitor, and news about the management of Company A. The user must read the different documents in the results to determine whether any of the documents includes performance information.

SUMMARY

Embodiments of the invention relate to systems, methods, and computer-readable media for generating contextual queries. A search engine receives a query from a client device along with context information provided by applications utilized during the current search session. In turn, a query understanding component processes the context information and query to generate a semantic representation of the query. The semantic representation of the query is further processed by a data source command generator to select several data source commands based on lexical information associated with each data source. The data source commands are issued from the data source command generator to the data sources to return answers and results to the search engine in response to the user query and generated contextual queries.

This summary is provided to introduce a selection of concepts in a simplified form that are further described below in the detailed description. This summary is not intended to identify key features or essential features of the claimed subject matter, nor is it intended to be used as an aid in isolation to determine the scope of the claimed subject matter.

BRIEF DESCRIPTION OF THE DRAWINGS

Illustrative embodiments of the invention are described in detail below with reference to the attached drawing figures, which are incorporated by reference herein, wherein.

DETAILED DESCRIPTION

This patent describes the subject matter for patenting with specificity to satisfy statutory requirements. However, the description itself is not intended to limit the scope of this patent. Rather, the inventors have contemplated that the claimed subject matter might also be embodied in other ways, to include different steps or combinations of steps similar to the ones described in this patent, in conjunction with other present or future technologies. Moreover, although the terms "step" and "block" may be used herein to connote different elements of methods employed, the terms should not be interpreted as implying any particular order among or between various steps herein disclosed unless and except when the order of individual steps is explicitly described.

As used herein the term "contextual query" refers to data commands that are used to access data sources and to retrieve information from the data sources based on the structure of the information included in the data source and the meaning of terms included in a query.

As used herein the term "component" refers to any combination of hardware, firmware, and software.

Embodiments of the invention provide contextual queries that allow a user to receive answers to the user query. The answers are collected from a large collection of content having structured data, semistructured data, and unstructured data. The contextual queries are generated by a computer system based on ontologies associated with the terms included in the query and applications that are utilized during a current search session. The contextual queries search a combination of structured, unstructured, and semistructured data for answers to the query.

For instance, answers for a user's finance queries are returned by a computer system using an ontology-driven understanding of the finance queries. The computer system may provide a finance application that enables users to obtain answers to natural language queries like "Companies with similar PE ratio as Company A," "Company A operating income," and "Company A and B valuation." An ontology is used by the computer system to understand a number of key ratios that should be calculated using current data in response to the queries. The key ratios may include, among other things, "PE Ratio," "Price-to-Sales ratio," etc. The natural language queries and corresponding ontologies are used to generate a semantic representation. The finance application may transform the semantic representation to a SPARQL query that is issued to data sources, which include records that are traversed to return the answers. In turn, the finance application returns a comparison of these ratios and other valuation metrics for the companies A and B.

The computer system receives queries from a user. Also, the computer system receives contexts for one or more applications traversed during the current search session. Using one or more ontologies, the computer system understands the queries and contexts and generates semantic representations of the queries and the contexts of the applications in which a user formulates the query. Concepts, instances, properties, and relations are included in the semantic representation of the queries based on the taxonomy, templates, or definitions included in the ontologies. In one embodiment, the semantic representation is a graph of the query using the extracted concepts, instances, properties, and relations, etc. In turn, the semantic representation may be automatically transformed by the data source command generator into data source specific query languages to retrieve relevant information and answers to the query.

Figure 1:
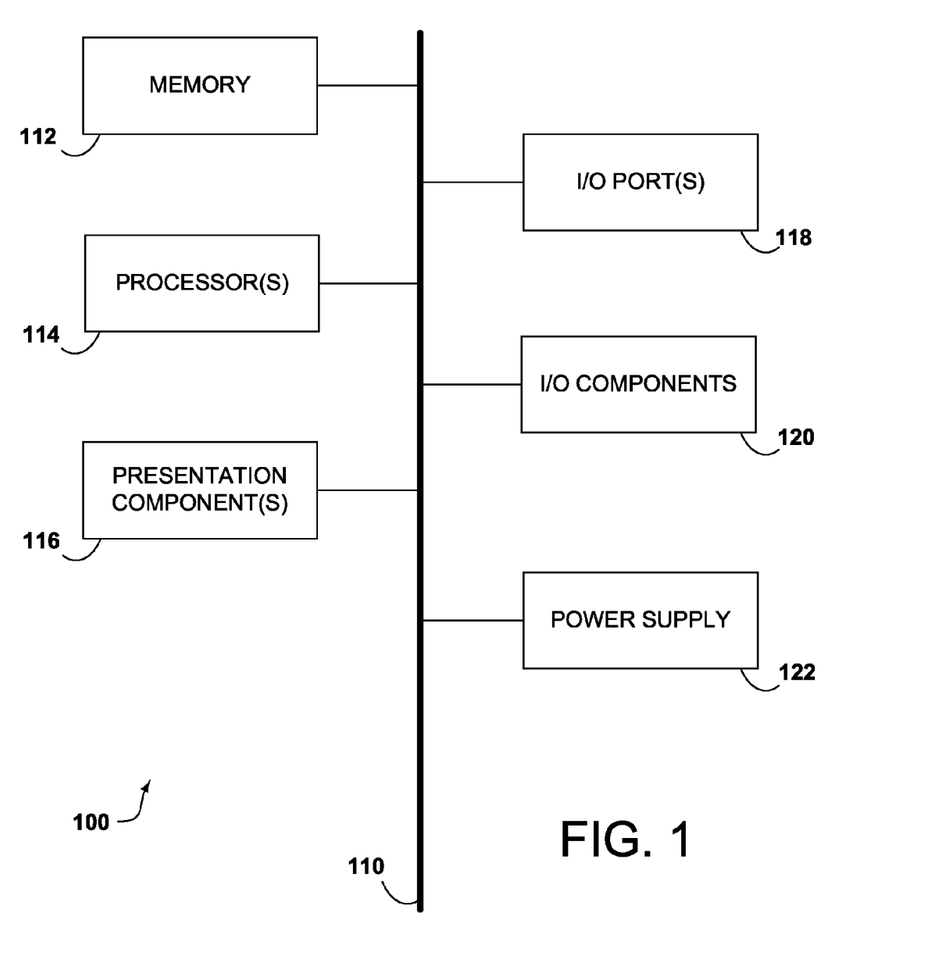
FIG. 1 is a block diagram illustrating an exemplary computing device in accordance with embodiments of the invention.

FIG. 1 is a block diagram illustrating an exemplary computing device 100 in accordance with embodiments of the invention. The computing device 100 includes bus 110, memory 112, processors 114, presentation components 116, input/output (I/O) ports 118, input/output (I/O) components 120, and a power supply 122. The computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other medium that may be used to encode desired information and be accessed by the computing device 100. Embodiments of the invention may be implemented using computer code or machine-useable instructions, including computer-executable instructions such as program modules, being executed by a computing device 100, such as a personal data assistant or other handheld device. Generally, program modules including routines, programs, objects, modules, data structures, and the like, refer to code that performs particular tasks or implements particular abstract data types. Embodiments of the invention may be practiced in a variety of system configurations, including distributed computing environments where tasks are performed by remote-processing devices that are linked through a communications network.

The computing device 100 includes a bus 110 that directly or indirectly couples the following components: a memory 112, one or more processors 114, one or more presentation components 116, input/output (I/O) ports 118, I/O components 120, and an illustrative power supply 122. The bus 110 represents what may be one or more busses (such as an address bus, data bus, or combination thereof). Although the various components of FIG. 1 are shown with lines for the sake of clarity, in reality, delineating various modules is not so clear, and metaphorically, the lines would more accurately be grey and fuzzy. For example, one may consider a presentation component 116 such as a display device to be an I/O component 120. Also, processors 114 have memory 112. Distinction is not made between "workstation," "server," "laptop," "handheld device," etc., as all are contemplated within the scope of FIG. 1.

The memory 112 includes computer-readable media and computer-storage media in the form of volatile and/or nonvolatile memory. The memory may be removable, nonremovable, or a combination thereof. Exemplary hardware devices include solid-state memory, hard drives, optical-disc drives, etc. The computing device 100 includes one or more processors 114 that read data from various entities such as the memory 112 or I/O components 120. The presentation components 116 present data indications to a user or other device. Exemplary presentation components 116 include a display device, speaker, printer, vibrating module, and the like. The I/O ports 118 allow the computing device 100 to be physically and logically coupled to other devices including the I/O components 120, some of which may be built in. Illustrative I/O components 120 include a microphone, joystick, game pad, satellite dish, scanner, printer, wireless device, and the like.

A computer system that generates contextual queries includes a search engine, a query understanding component, and a data source command generator. The contextual queries are generated based on ontologies associated with a query provided by the client device and ontologies corresponding to applications that formulated the query. The search engine receives the query from the client device and context from the application. In turn, the search engine transmits answers to the contextual queries and results that include content corresponding to the query to a client device. The client device displays the results along with the answers.

Figure 2:
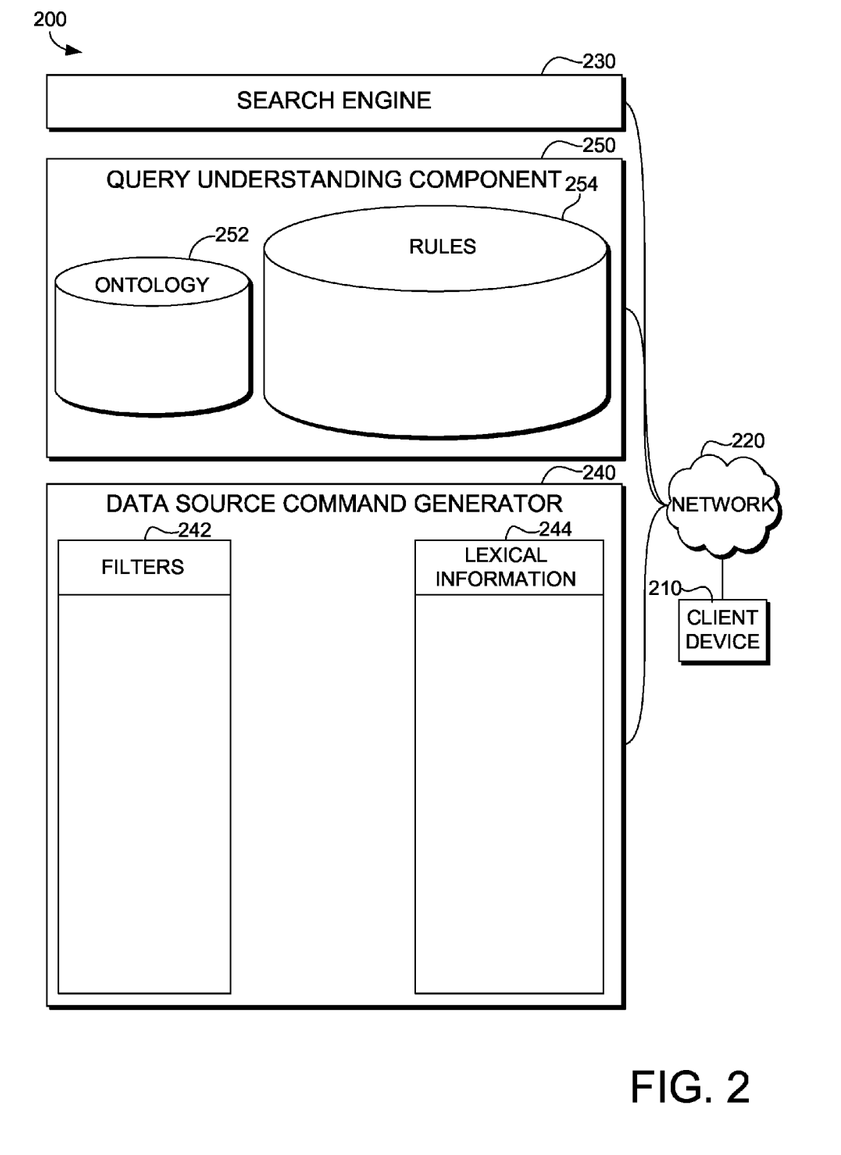
FIG. 2 is a network diagram illustrating exemplary components of a computer system configured to generate contextual queries in accordance with embodiments of the invention.

FIG. 2 is a network diagram illustrating exemplary components of a computer system configured to generate contextual queries in accordance with embodiments of the invention. The computer system 200 has a client device 210, a network 220, search engine 230, data source command generator 240, and query understanding component 250.

The client device 210 is connected to the search engine 230 via network 220. In some embodiments, the client device 210 may be any computing device that is capable of web accessibility. As such, the client device 210 might take on a variety of forms, such as a personal computer (PC), a laptop computer, a mobile phone, a personal digital assistant (PDA), a server, a CD player, an MP3 player, a video player, a handheld communications device, a workstation, any combination of these delineated devices, or any other device that is capable of web accessibility.

The client device 210 allows a user to enter queries. The client device 210 transmits the queries to the search engine 230. In certain embodiments, the client device 210 also transmits a context associated with an application used by the user to formulate the query. In other embodiments, the search engine 230 may provide the context. In turn, the client device 210 receives results that include answers. The client device 210 may also display the answers for the contextual queries and results for the queries to the users.

The network 220 connects the client device 210, search engine 230, data source command generator 240, and query understanding component 250. The network 220 may be wired, wireless, or both. The network 220 may include multiple networks, or a network of networks. For example, the network 220 may include one or more wide area networks (WANs), one or more local area networks (LANs), one or more public networks, such as the Internet, or one or more private networks. In a wireless network, components such as a base station, a communications tower, or even access points (as well as other components) may provide wireless connectivity in some embodiments. Although single components are illustrated for the sake of clarity, one skilled in the art will appreciate that the network 220 may enable communication between any number of client devices 210.

The search engine 230 is a server computer that provides results for queries received from client devices 210 and answers to contextual queries dynamically generated by the data source command generator 240. The search engine 230 is configured to receive user queries and application contexts. The search engine 230 returns results to the user queries and answers to the contextual queries. In some embodiments, the search engine 230 returns only answers to the contextual queries.

The data source command generator 240 is communicatively connected to the query understanding component 250. In one embodiment, the data source command generator 240 includes filters 242 and lexical information 244. The data source command generator 240 is configured to transform a semantic representation provided by the query understanding component 250 into contextual queries that are applied across multiple data sources using data source commands selected based on lexical information 244 associated with each data source. In one embodiment, the data sources include unstructured, structured, or semistructured data sources that are queried using one of: Structured Query Language (SQL), SPARQL Protocol and RDF Query Language (SPARQL), or textual keyword queries.

The filters 242 are configured to refine the semantic representation provided by the query understanding component 250. The filters 242 refine the semantic representation by augmenting the semantic representation based on information associated with a current query session. In one embodiment, the filter 242 includes domain, collaboration, geographic, temporal, task, and user. The domain filter may be identified based on application context. For instance, a user searching for stock may be interested in the finance domain or cooking domain. The data source command generator 240 may select one of these domains based on the other filters 242. For instance, the collaboration or community filters may indicate that the user is connected to cooking groups or finance groups. Based on the group associated with the user, the data source command generator 240 selects the relevant domain filter. For instance, a user in a finance community is likely interested in company stock. Accordingly, the domain filter may be set to finance. The geographic filter may include the current location of the user. For example, a user that is a British subject in England may issue the query, and the geographic filter may set to England by the computer system 200. The temporal filter may include the time frame for the query. If a date or time is not included in the query, the temporal filter may be set to the current 24-hour time period. The task filter may be selected based on the application used by the user or it may be inferred by the computer system 200. The task filter may include checking email, searching for content, editing a document, etc. The user filter may include profile attributes that override values selected for the other filters 242. For instance, a British subject user may specify in a profile that interests include U.S. stock. Accordingly, the geographic information for the stock query may be changed from England to United States of America. These values for the filters 242 are included in the semantic representation that is transformed to the contextual queries by the data source command generator 240.

The lexical information component 244 is a part of the data source command generator 240. The lexical information component 244 is used to select data sources that should receive the contextual queries. The data sources having lexical information similar to the terms of the contextual query are selected to receive the contextual query. In one embodiment, the lexical information component 244 stores lexical information associated with ontologies and the data sources that store the content that is traversed by the search engine. In some embodiments text mining is performed on each data source by the computer system to select lexical information associated with each data source that is stored in the lexical information component 244.

In turn, the data source command generator 240 generates contextual queries that are issued against the selected data sources. The semantic representation of the query may be further processed to select appropriate commands for the selected data sources. The lexical information component 244, ontologies 252, and rules 254 are accessed to identify methods for each data source that access or compute relevant information from data sources based on the semantic description of concepts, properties, and relations included in the semantic representation.

The query understanding component 250 is configured to store ontologies 252 that identify the query type and context type. The query understanding component 250 also provides rules 254 associated with items in the ontologies 252 that expand a semantic representation and identify methods that access or compute relevant information from data sources based on a semantic description of concepts, properties, and relations expressed in the ontologies 252. For instance, the query type may identify one or more input types and one or more output types, where the input and output types correspond to concepts, instances, properties, or relations in a query ontology or a context ontology.

The query understanding component 250 is configured to generate the semantic representation of the query and context. The query ontology and context ontology may be used by the query understanding component 250 to generate a graph of the semantic representation based on the uniform resource identifiers (URIs) associated with the each concept, instance, etc., included in the ontologies 252. The semantic representation is conditioned by the appropriate context rules of the user query and application context.

In one embodiment, the graph is a semantic query representation (SQR) that is formatted in extensible markup language (XML). The SQR may include the following nodes: query type (QT), Context (CXT), and Display (DSP) templates. For instance, a natural language query for Company A may have the following SQR <QT: Instance Profile: Company; Instance Type: Stock; Instance URI: Company A> <CXT: Natural Language, Finance> <DSP: Company Name, Symbol, News>.

Depending on the data source, the semantic query representation is translated into data source-specific queries to retrieve relevant answers and information from those data sources. In the semantic representation, QT is a formal representation of a hierarchy of the different types of queries an application can expect from its users. Each QT is qualified by a set of input and output parameters that facilitate extensions to other parts of the ontology. CXT is a formal representation of a hierarchy of the different types of contexts in which the user query can be captured and interpreted. CXT can be explicitly identified by the applications a user interacts to issue their queries or implicitly derived from the query text. Each CXT identifies the conditions and criteria for interpreting concepts, instances, etc., in a given query. The CXT may either expand or disambiguate the concepts, instances, etc. included in the semantic query representation. The semantic graph is structured according to QT and CXT templates associated with the query type in the query-type ontology and the context type in the context-type ontology and lexical information associated with each data source.

The ontologies 252 include words or phrases that correspond to content in the data sources. Each ontology 252 includes a taxonomy for a domain and the relationship between words or phrases in the domain. The domains may include medicine, art, computers, etc. In one embodiment, the ontologies 252 also store the query type and context type. The query type identifies the type and structure of textual user queries. For instance, the query type may include natural language, structured, in-line command, etc. The context type identifies and organizes the different types of contexts in which queries can be expressed. For instance, the context may include search engine, email application, finance application, etc. The ontology 252 is associated with rules 254. The rules may be referenced in the semantic query representation using a URI corresponding to the appropriate rule.

The rules 254 identify the concepts, instances, properties, and relations across a number of domains. In certain embodiments, the rules 254 may define methods or functions that are used to compute results from data included in the data sources. For instance, the rules 254 may include comparators, mathematical functions, statistical functions, or other heuristics. In other embodiments, the rules 254 may also be associated with functions identified in the commands available for the data sources.

In an embodiment, answers are transmitted to a client device based on contextual queries that are dynamically generated from queries received from a user of the client device. The computer system may execute a computer-implemented method for dynamically generating contextual queries based on ontologies corresponding to the query and application traversed by the user when formulating the query.

Figure 3:
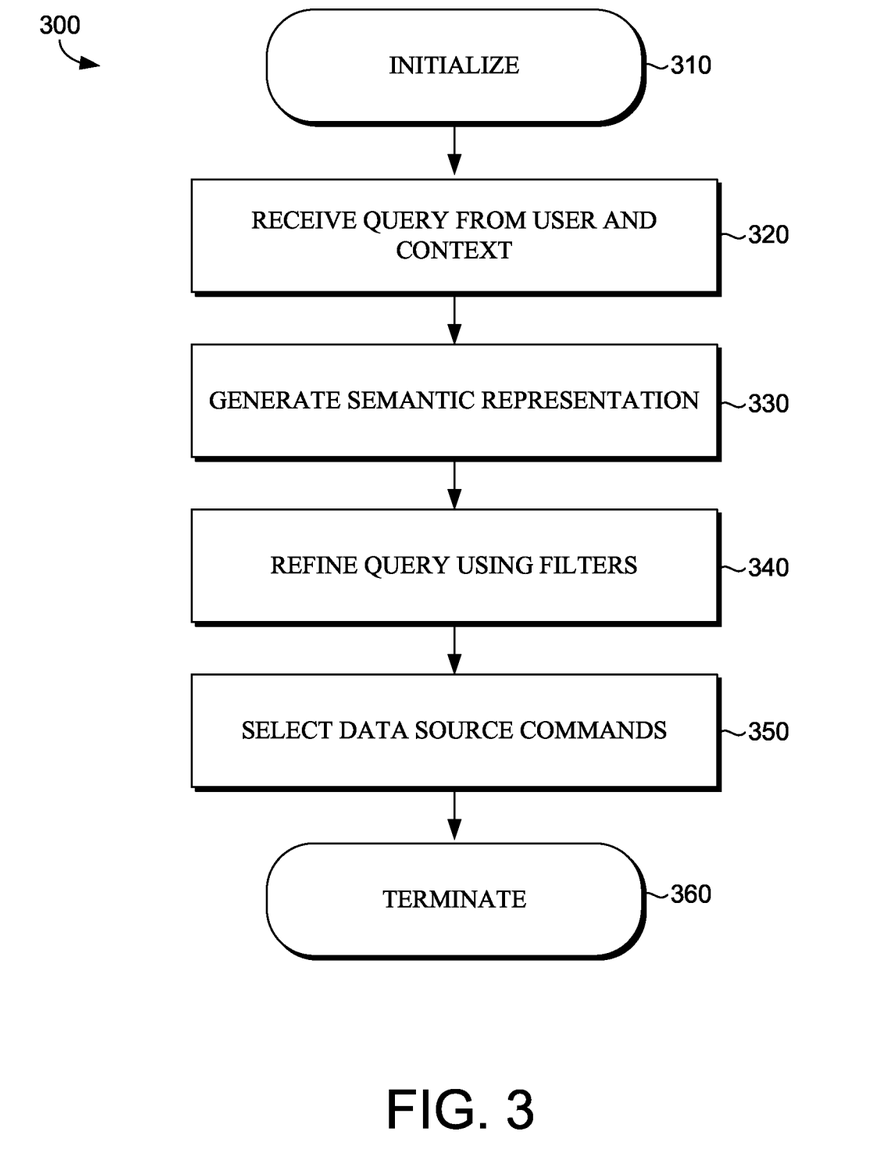
FIG. 3 is a logic diagram illustrating a computer-implemented method for generating contextual queries in accordance with embodiments of the invention.

FIG. 3 is a logic diagram illustrating a computer-implemented method for generating contextual queries in accordance with embodiments of the invention. The method initializes in step 310 when the computer system is connected to a network of client devices.

In step 320, the computer system receives a user query and application context. The context is provided by an application that the user operates during the current query session. In step 330, the computer system generates a semantic representation of the query using domain ontologies. The computer system determines a query and context type using query and context ontologies. The structure for the semantic representation is derived from a template associated with a query type included in the query ontology or context type included in the context ontology.

The semantic representation is refined using filters associated with each domain traversed in a current query session, in step 340. The filters augment the semantic representation with criteria associated with one or more applications operated by the user during the current query session request. In step 350, the computer system selects one or more data source commands to issue against data sources having content associated with terms in the query. In certain embodiments, the data sources include structured data sources, unstructured data sources, and semistructured data sources. The structured data sources are queried using one of: Structured Query Language (SQL) or SPARQL Protocol and RDF Query Language (SPARQL). The unstructured or semistructured data sources are queried using textual keyword queries. The method terminates in step 360.

In summary, contextual queries allow a user to traverse multiple data sources using information built into ontologies associated with a query provided by a user and ontologies associated with applications utilized to generate the query. For instance, a user may send a query to a search engine, which returns a number of results. In addition, the search engine may also provide answers associated with contextual queries formulated from the user query.

For instance, answers for a user's finance queries are returned by the computer system using an ontology-driven understanding of the finance queries. The computer system may provide a finance application that enables users to obtain answers to natural language queries like "Companies with similar PE ratio as Company A," "Company A operating income," and "Company A and B valuation." The latter query processing may use the ontology to understand valuation includes a number of key ratios that should be calculated using current data. The key ratios may include, among other things, "PE Ratio," "Price-to-Sales ratio," etc. In turn, the finance application returns a comparison of these ratios and other valuation metrics for the companies A and B. The natural language queries and corresponding ontologies are used to generate a semantic representation. The finance application may transform the semantic representation to a SPARQL query that is issued to data sources, which include records that are traversed to return the answers.

The computer system receives a query: "MSFT higher PE" from a user and application context: "finance" and "natural language" from the finance application. The computer system identifies the finance ontology and natural language ontology. In turn, the query is transformed using a linguistic interpretation to "MSFT higher/high-1 PE." The finance ontology may be used to further transform the semantic representation using mathematical operators and the definition for PE ratio. The semantic representation is transformed to "MSFT higher/high-1 Comparator PE." The computer system may apply a number of filters to refine the semantic representation. In an embodiment, the semantic representation is a query graph generated using the ontologies. The filters include domain, collaboration, community, geographic, temporal, task, and user interests. After applying these filters, the computer system transforms the query to "Ticker MSFTUS/Ticker higher greater-1PE/PE ratio Date: today." In turn the semantic representation is converted to data source commands. The computer system may issue the following: "Ticker.PeRatio>MSFTQUS.PERatio&&Date=today." This data source command is sent to multiple data sources to locate the answers.

Many different arrangements of the various components depicted, as well as components not shown, are possible without departing from the spirit and scope of the present invention. Embodiments of the invention have been described with the intent to be illustrative rather than restrictive. It is understood that certain features and subcombinations are of utility and may be employed without reference to other features and subcombinations and are contemplated within the scope of the claims. Not all steps listed in the various figures need be carried out in the specific order described.

The invention claimed is:

1. A computer-implemented method to generate contextual queries, the method comprising:
    receiving a user query and context, wherein the context is provided by one or more applications that the user operates during the current query session;
    generating a semantic representation of the query using domain ontologies, wherein the domain ontologies identify filters, concepts, and relations in a number of categories;
    refining the semantic representation using filters associated with each domain traversed in a current query session, wherein some filters augment the semantic representation with criteria of the one or more applications operated by the user during the current query session; and
    selecting one or more data source commands to issue against data sources having content associated with terms in the query based on the context and the semantic representation.

2. The method of claim 1, further comprising:
    determining a query and context type using query and context ontologies.

3. The method of claim 2, wherein structure for the semantic representation is derived from a template associated with a query type included in the query ontology.

4. The method of claim 1, wherein the data source includes structured data sources, unstructured data sources, and semistructured data sources.

5. The method of claim 4, wherein the structured data sources are queried using one of: Structured Query Language (SQL) or SPARQL Protocol and RDF Query Language (SPARQL).

6. The method of claim 4, wherein the unstructured or semistructured data sources are queried using textual keyword queries.

7. The method of claim 4, wherein the data source commands are selected based on lexical information associated with each data source.

8. The method of claim 1, wherein some filters include mathematical operators that are associated with the one or more applications operated by the user.

9. The method of claim 1, wherein application contexts for the one or more applications are selected from the domain ontologies when generating the semantic query representation.

10. One or more computer readable media, not a signal per se, configured to perform a method to process queries, the method comprising:
    receiving a user query and context, wherein the context is provided by one or more applications that the user operates during the current query session;
    generating a semantic representation of the query using domain ontologies;
    refining the semantic representation using filters associated with each domain traversed in a current query session, wherein some filters augment the semantic representation with criteria of the one or more applications operated by the user during the current query session; and
    selecting one or more data source commands to issue against a data source having content associated with terms in the query.

11. The media of claim 10, further comprising: determining a query and context type using query and context ontologies.

12. The media of claim 11, wherein structure for the semantic representation is derived from a template associated with a query type included in the query ontology.

13. The media of claim 10, wherein the data source includes structured data sources, unstructured data sources, and semistructured data sources.

14. The media of claim 13, wherein the structured data sources are queried using one of: Structured Query Language (SQL) or SPARQL Protocol and RDF Query Language (SPARQL).

15. The media of claim 13, wherein the unstructured or semistructured data sources are queried using textual keyword queries.

16. The media of claim 10, wherein some filters include mathematical operators that are associated with the one or more applications operated by the user during the session.

17. The media of claim 10, wherein application contexts for the one or more applications are selected from the domain ontologies when generating the semantic query representation.

18. A computer system having processors and memories configured to generate contextual queries, the system further comprising:
    a search engine configured to receive user queries and contexts;
    a query understanding component configured to store ontologies that identify the query type and application type, the query type identifies one or more input types and one or more output types, wherein the input and output types correspond to concepts, instances, properties, or relations in a domain ontology or an application ontology; and
    a data source command generator communicatively connected to the query understanding component, wherein the data source command generator is configured to transform a semantic representation provided by the query understanding component into contextual queries that are applied across multiple data sources using data source commands selected based on lexical information associated with each data source.

19. The computer system of claim 18, wherein the ontologies provide rules that expand the semantic query representation and identify methods that access or compute relevant information from data sources based on a semantic description of concepts, properties, and relations expressed in the ontologies.

20. The computer system of claim 18, wherein the data sources include unstructured, structured, or semistructured data sources and are queried using one of: Structured Query Language (SQL), SPARQL Protocol and RDF Query Language (SPARQL), or textual keyword queries.

* * * * *